(12) United States Patent
Saitoh et al.

(10) Patent No.: US 8,094,263 B2
(45) Date of Patent: Jan. 10, 2012

(54) OPTICAL COMPENSATION FILM, POLARIZING PLATE AND LIQUID CRYSTAL DISPLAY DEVICE

(75) Inventors: Yukito Saitoh, Minami-ashigara (JP); Mitsuyoshi Ichihashi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 303 days.

(21) Appl. No.: 12/549,591

(22) Filed: Aug. 28, 2009

(65) Prior Publication Data
US 2010/0053509 A1   Mar. 4, 2010

(30) Foreign Application Priority Data
Aug. 28, 2008   (JP) .................. 2008-220025

(51) Int. Cl.
*G02F 1/1335* (2006.01)
*G02B 1/08* (2006.01)

(52) U.S. Cl. .......................... 349/96; 349/117

(58) Field of Classification Search .............. 349/96, 349/97, 98, 75, 87, 110, 117, 118, 122
See application file for complete search history.

(56) References Cited

U.S. PATENT DOCUMENTS

| | | | |
|---|---|---|---|
| 7,289,266 B1 * | 10/2007 | Kamijo et al. | 359/487.02 |
| 2007/0159580 A1 * | 7/2007 | Yoshioka et al. | 349/117 |
| 2007/0195243 A1 * | 8/2007 | Miyatake et al. | 349/117 |
| 2007/0242353 A1 * | 10/2007 | Kamijo et al. | 359/491 |
| 2010/0053509 A1 * | 3/2010 | Saitoh et al. | 349/96 |

FOREIGN PATENT DOCUMENTS
JP   4-305602 A   10/1992
JP   2001-350022 A   12/2001

* cited by examiner

*Primary Examiner* — Brian Healy
(74) *Attorney, Agent, or Firm* — Buchanan Ingersoll & Rooney PC

(57) ABSTRACT

The present invention relates to an optical compensation film comprising a light absorbing layer and a retardation layer, wherein the light absorbing layer shows absorption anisotropy in the plane (x-y plane) thereof with respect to light of wavelength λ nm in the visible light region and a degree of polarization P of 0.986 or smaller, and the in-plane absorption axis of the light absorbing layer and the in-plane slow axis of the retardation layer are orthogonal to each other.

9 Claims, 2 Drawing Sheets

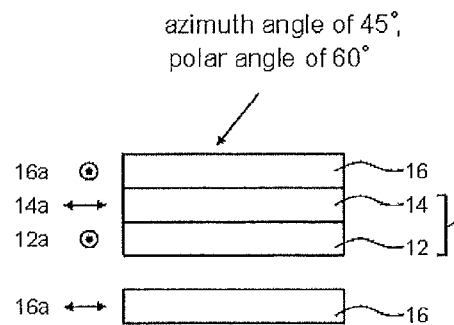
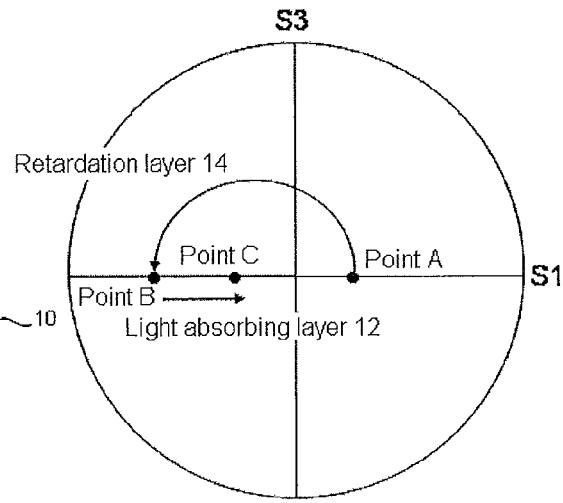
FIG. 1A
FIG. 1B
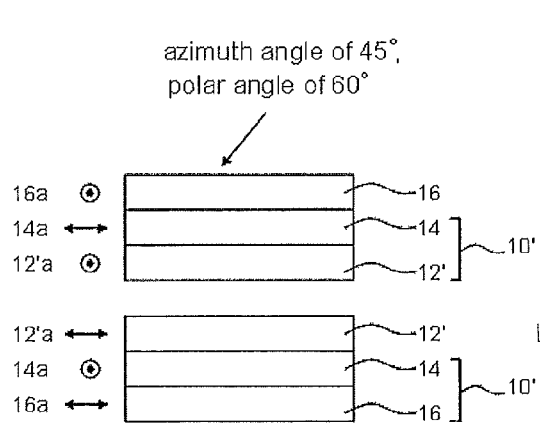
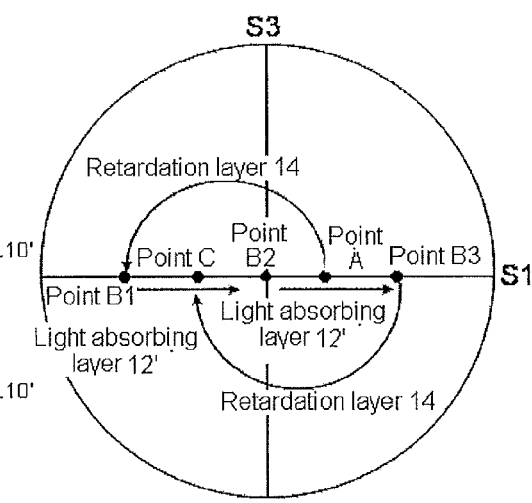
FIG. 2A
FIG. 2B

OPTICAL COMPENSATION FILM, POLARIZING PLATE AND LIQUID CRYSTAL DISPLAY DEVICE

CROSS-REFERENCE TO RELATED APPLICATIONS

This application claims benefit of priority under 35 U.S.C. 119 to Japanese Patent Application No. 2008-220025 filed on Aug. 28, 2008, which is expressly incorporated herein by reference in its entirety.

BACKGROUND OF THE INVENTION

1. Technical Field

The present invention relates to a novel optical compensation film capable of contributing to widening viewing angles of polarizing plates, and a polarizing plate and a liquid crystal display device, having the optical compensation film, improved in viewing angle characteristics.

2. Background Art

Transmission-type liquid crystal display device generally has a pair of polarizing plates, disposed so as to align their axes of polarization orthogonally to each other. The orthogonality is, however, lost with respect to incident light coming in oblique directions, even if two polarizing plates are stacked so that the axes of polarization are orthogonal to each other. This is a reason for leakage of light from the liquid crystal display device in the black state, when viewed in oblique directions. In order to provide a liquid crystal display device excellent in the viewing angle characteristics, it may therefore be necessary to solve viewing angle dependence of polarizing plates. Aiming at obtaining wide-viewing-angle polarizing plates, various proposals have conventionally been made on combination of a polarizer and a retardation layer which exhibits predetermined optical characteristics (see Japanese Laid-Open Patent Publication Nos. H4-305602 and 2001-350022, for example).

SUMMARY OF THE INVENTION

According to the techniques of solving the problems described in two publications in the above, a retardation layer having an Nz value of 0.5 or around is necessarily used in order to provide an ideal wide-viewing-angle polarizing plate. It is, however, not easy to attain an Nz value of 0.5 or around, by using a polymer film or the like. For example, it may raise limitations on source materials, or may raise needs of complicated processes in the manufacturing, or strict controls of conditions for manufacturing.

It is therefore an object of the present invention to provide a novel technique of successfully widening viewing angles of polarizing plates, without using a retardation layer having an Nz value of 0.5 or around.

It is therefore another object of the present invention to provide a novel optical compensation film capable of contributing to widening viewing angles of polarizing plates, and a novel polarizing plate and a liquid crystal display device showing wide viewing angle characteristics.

The means for achieving the above mentioned objects are as follows.

[1] An optical compensation film comprising a light absorbing layer and a retardation layer, wherein
the light absorbing layer shows absorption anisotropy in the plane (x-y plane) thereof with respect to light of wavelength λ nm in the visible light region and a degree of polarization P of 0.986 or smaller, and
the in-plane absorption axis of the light absorbing layer and the in-plane slow axis of the retardation layer are orthogonal to each other.

[2] The optical compensation film of [1], wherein in-plane absorption coefficients $kx(\lambda)$ and $y(\lambda)$ (where, $ky(\lambda) < kx(\lambda)$) of the light absorbing layer and the thickness d (nm) of the light absorbing layer satisfy the following relation:

$$22\ \text{nm} \leq (kx(\lambda) - ky(\lambda)) \times d \leq 215\ \text{nm}.$$

[3] The optical compensation film of [1], wherein in-plane absorption coefficients $kx(\lambda)$ and $y(\lambda)$ (where, $ky(\lambda) < kx(\lambda)$) of the light absorbing layer and the thickness d (nm) of the light absorbing layer satisfy the following relation $$65\ \text{nm} \leq (kx(\lambda) - ky(\lambda)) \times d \leq 215\ \text{nm}.$$

[4] The optical compensation film of any one of [1]-[3], wherein Nz of the retardation layer satisfies 0.5<Nz<2:
where Nz is defined as Nz=Rth(550)/Re(550)+0.5; Re(550) is retardation in plane of the retardation layer measured at 550 nm; and Rth(550) is retardation along the thickness direction of the retardation layer measured at 550 nm; and
Re(550) of the retardation layer is 206 to 344 nm.

[5] The optical compensation film of any one of [1]-[4], wherein retardation in plane the retardation layer measured at wavelength λ nm in the visible light region, Re(λ), satisfies the following relation:

$$Re(450) < Re(550) < Re(630).$$

[6] The optical compensation film of any one of [1]-[5], wherein the light absorbing layer is a layer formed of a composition comprising, at least, a rod-like liquid crystal and a dichroic dye.

[7] A polarizing plate comprising at least a polarizer and an optical compensation film of any one of [1]-[6], wherein the absorption axis of the polarizer and the in-plane absorption axis of the light absorbing layer are parallel to each other.

[8] A liquid crystal display device comprising at least one polarizing plate of any one of [1]-[7].

[9] The liquid crystal display device of any one of [1]-[9], employing an IPS-mode.

BRIEF DESCRIPTION OF THE DRAWINGS

FIG. 1A is a schematic sectional view of one embodiment of the optical compensation film of the present invention applied to widen the viewing angle of a polarizer, and FIG. 1B is a schematic drawing of the Poincaré sphere used for explaining function of the optical compensation in this embodiment.

FIG. 2A is a schematic sectional view of another embodiment of the optical compensation film of the present invention applied to widen the viewing angle of a polarizer, and FIG. 2B is a schematic drawing of the Poincaré sphere used for explaining function of the optical compensation in this embodiment.

DETAILED DESCRIPTION OF THE INVENTION

Figure 3:
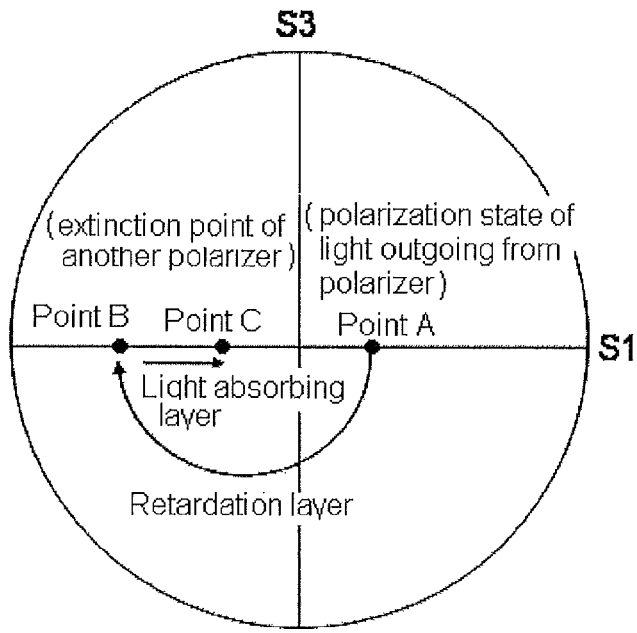
FIG. 3 is a schematic drawing of the Poincaré sphere used for explaining function of the optical compensation according to another embodiment of the optical compensation film of the present invention.

The invention is hereunder described in more detail. Note that, in this patent specification, any numerical expressions in a style of " . . . to . . . " will be used to indicate a range including the lower and upper limits represented by the numerals given before and after "to", respectively.

In this description, Re(λ) and Rth(λ) are retardation in plane (nm) and retardation along the thickness direction (nm), respectively, at a wavelength of λ. Re(λ) is measured by applying light having a wavelength of λ nm to a film in the normal direction of the film, using KOBRA 21ADH or WR (by Oji Scientific Instruments).

When a film to be analyze by a monoaxial or biaxial index ellipsoid, Rth(λ) of the film is calculated as follows.

Rth(λ) is calculated by KOBRA 21ADH or WR based on six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth(λ) of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (1) and (2):

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (1)$$

$$Rth = \left[\frac{nx+ny}{2} - nz\right] \times d \quad (2)$$

wherein Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the film to be analyzed is not expressed by a monoaxial or biaxial index ellipsoid, or that is, when the film does not have an optical axis, then Rth(λ) of the film may be calculated as follows. The selectivity of the measurement wavelength λ nm may be conducted by a manual exchange of a wavelength-filter, a program conversion of a measurement wavelength value or the like.

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, Nz=(nx−nz)/(nx−ny) is further calculated.

Note that the "visible light region" in the context of this patent specification means the wavelength range from 380 nm to 780 nm, and any measured values given with no special indication of measurement wavelength represent those measured at 550 nm. It is to be understood also that values and numerical ranges depicting optical characteristics indicate values and numerical ranges containing errors generally allowable to liquid crystal display devices and components used therefore. The same will apply also to positional relations ("parallel", "orthogonal" and so forth) of the optical axes (axis of polarization of polarizer, or slow axis of optically anisotropic layer, and so forth), and angular relations among these axes.

In the description, the terms "polar angle" and "azimuth angle" are defined as follows. The term "polar angle" is defined as a inclined angle relative to the direction, that is, the z-axis, along the normal line of the film plane. According to the definition, the direction along the normal line of the film is the direction with the polar angle of 0 degree. The term "azimuth angle" indicates an azimuth direction rotated anti-clockwise by a certain angle around the positive direction of the x-axis in the film plane. According to the definition, the positive direction of the x-axis is the direction with an azimuth angle of 0 degree; and the positive direction of the y-axis, which is in the film plane as well as the x-axis, is the direction with an azimuth angle of 90 degrees. Generally, when a pair of polarizing plates which are disposed so that their absorption axes are orthogonal to each other, in particular, one of them is disposed in the direction with an azimuth angle of 0 degree and another is disposed in the direction with an azimuth angle of 90 degrees, is observed, leakage of light would be observed in the oblique directions, which are mainly the directions with a polar angle not equal to 0 degree and an azimuth angles of 45, 135, 225 and 315 degrees. It is to be noted that, in the description, the direction with 0 degree is defined as a direction of an absorption direction of a polarizing plate disposed at the backlight side.

1. Optical Compensation Film

The present invention relates to an optical compensation film having a light absorbing layer and a retardation layer. The light absorbing layer shows in-plane absorption anisotropy with respect to light of wavelength λ nm in the visible light region, and more specifically, in-plane (in the x-y plane) absorption coefficients kx(λ) and y(λ) of which satisfy the relation of ky(λ)<kx(λ). On the other hand, the retardation layer has at least an in-plane slow axis. The light absorbing layer and the retardation layer are stacked so that the in-plane absorption axis of the light absorbing layer, which is the x-axis giving the absorption coefficient kx(λ), and the in-plane slow axis of the retardation layer are orthogonal to each other.

The optical compensation film of the present invention may have any layer(s) other than the light absorbing layer and the retardation layer, such as an alignment film used for forming the light absorbing layer. Each of the retardation layer and the light absorbing layer may be composed of a plurality of layers.

One embodiment of the optical compensation film of the present invention may be an embodiment containing the retardation layer having an Nz value which satisfies 0.5<Nz<2. Nz herein may be defined as Nz=Rth(550)/Re(550)+0.5. The optical compensation film of this embodiment is capable of reducing viewing angle dependence of a pair of polarizers disposed so that there absorption axes are orthogonal to each other. The operation will be explained referring to FIGS. 1A and 1B. As illustrated in FIG. 1A, in this embodiment, polarizers 16 are disposed so that their absorption axes 16a are orthogonal to each other; and one of polarizers 16 is improved in terms of viewing angle characteristics by an optical compensation film 10 (composed of a light absorbing layer 12 and a retardation layer 14) of the present invention. The wide viewing angle polarizer 16 is stacked so that its absorption axis 16a is orthogonal to the in-plane slow axis 14a of the retardation layer 14, and also parallel to an in-plane absorption axis 12a of the light absorbing layer 12. FIG. 1B is a three-dimensional map depicting the state of polarization of light which passes through the polarizer 16→retardation layer 14→light absorbing layer 12, wherein any points on the equator of the sphere represent the state of linear polarization characterized by an ellipticity of 0. Azimuth and polar angles of the incident light are 45° and 60°, respectively, wherein the Poincaré sphere is viewed in the direction of the S2 axis from the positive side. FIG. 1B illustrates an example wherein the retardation layer 14 has an Nz value of 1, that is, is optically monoaxial, and has Re(550) of 270 nm.

In FIG. 1B, point A represents a state of polarization of light coming into the polarizer 16 in the oblique direction, passing therethrough, and then being thereby converted to have linear polarity. If the linearly polarized light having a state of polarization represented by point A is converted, as a result of passage through the retardation layer 14 and the light absorbing layer 12, to have a state of polarization represented by point C, which is an extinction point (achieved by one polarizer 16, and another polarizer 16 disposed so as to align the absorption axes 16a thereof orthogonally to each other) on the S1 axis, the viewing angle dependence of the pair of polarizers may successfully be resolved, and thereby the leakage of light in oblique directions may be moderated.

As illustrated in FIG. 1B, the state of polarization represented by point A moves, as a result of passage through the retardation layer 14 characterized by Nz=1, once to point B on the S1 axis, which is more largely apart from point A than point C is. Thereafter, the incident light passes through the light absorbing layer 12, where the state of polarization moves on the S1 axis from point B towards point A to reach extinction point C, because the in-plane absorption axis 12a of the light absorbing layer 12 and the absorption axis 16a of the polarizer 16 are parallel to each other. In conventional methods of causing direct transition from the state of polarization at point A to extinction point C, it has been necessary, for example, to allow the light to pass through a retardation layer having Nz=0.5 or around. It has, however, been not easy to achieve the retardation layer having Nz=0.5 or around using polymer or the like, as described in the above. In this embodiment, by allowing light to pass through the retardation layer 14 having Nz=1, which can be prepared in a relatively simple manner, and then to pass through the light absorbing layer 12, the state of polarization may successfully be moved via point B to extinction point C.

FIG. 1B illustrates an example wherein the retardation layer 14 has an Nz value of 1, that is, is optically monoaxial, and has Re(550) of 270 nm. The effect of the present invention may, however, be obtainable not only by the embodiment making use of a retardation layer which satisfies the above-described optical characteristics. More specifically, the effect of the present invention is essentially ascribable to transition (first transition) of the state of polarization of obliquely-incident light to a point of extension (point B in FIG. 1B) beyond point A and extinction point C on the S1 axis, as a result of passage through the retardation layer, and the next transition (second transition) of the state of polarization from the point of extension (point B in FIG. 1B) to extinction point C which falls on midway to point A, as a result of passage through the light absorbing layer. The viewing angle dependence of the polarizers may thus be resolved by two these processes of transition. The point of extension reached after the first transition depends on Nz of the retardation layer, and the point reached after the second transition depends on Δk(λ) (=kx(λ)−ky(λ))×d of the light absorbing layer. As a consequence, the effect similar to that illustrated in FIGS. 1A and 1B may be obtainable by any embodiment, so far the individual characteristics of the retardation layer and the light absorbing layer are appropriately adjusted so that extinction point C may be reached. In order to make the state of transition reach the point which falls further beyond point C as viewed from point A after the first transition, what is necessary is that the retardation layer has Nz>0.5, and has the in-plane slow axis aligned orthogonally to the absorption axis of the polarizer; or has Nz<0.5, and has the in-plane slow axis aligned in parallel with the absorption axis of the polarizer, wherein the condition of Nz=1 is not always necessary. On the other hand, also with respect to the light absorbing layer, the state of polarization may be moved from point B towards point A along the S1 axis, if the light absorbing layer has in-plane absorption anisotropy, or characterized by Δk(λ) (=kx(λ)−ky(λ))>0, and the in-plane absorption axis (or the x-axis) aligns in parallel with the absorption axis of the polarizer. Since value of Δk(λ)×d allowing transition from the point of extension to extinction point C varies depending, for example, on the position of the point of extension, or Nz of the retardation layer, and on the number of light absorbing layers allowing the incident light to pass therethrough, so that Δk(λ) of the light absorbing layer may be determined taking these factors into consideration, so as to allow transition to point extinction point C by the second transition.

FIGS. 2A and 2B illustrate an exemplary case where both of the pair of polarizers are improved in terms of the viewing angle characteristics with the aid of the optical compensation film of the present invention. The embodiment will be explained using the Poincaré sphere similar to that illustrated in FIG. 1B.

As illustrated in FIG. 2A, in this embodiment, the both of the pair of linear polarizers are improved in terms of the viewing angle characteristics with the aid of the optical compensation films 10' of the present invention, thereby the incident light passes sequentially through the polarizer 16→retardation layer 14→light absorbing layer 12'→light absorbing layer 12'→retardation layer 14. The retardation layer 14 has Re(550) of 270 nm, and an Nz value of 1 which means optically monoaxial, similarly to that illustrated in FIG. 1A.

In FIG. 2B, point A represents a state of polarization of light coming into the polarizer 16 in the oblique direction, passing therethrough, and then being thereby converted to have linear polarity. If the linearly polarized light having a state of polarization represented by point A is converted, as a result of passage through the retardation layer 14 and the light absorbing layer 12', and passage again through the light absorbing layer 12' and the retardation layer 14, to have a state of polarization represented by point C, which is an extinction point (achieved by one polarizer 16, and another polarizer 16 disposed so as to align the absorption axes 16a thereof orthogonally to each other) on the S1 axis, the viewing angle dependence of the pair of polarizers may successfully be resolved, and thereby the leakage of light in oblique directions may be moderated.

As illustrated in FIG. 2B, the state of polarization represented by point A moves, as a result of passage through the retardation layer 14 characterized by Nz=1, once to point B1 on the S1 axis, which is more largely apart from point A than point C is. Thereafter, the incident light passes through the light absorbing layer 12', where the state of polarization moves on the S1 axis from point B1 towards point A, and passes the extinction point C to reach point B2, because the in-plane absorption axis 12a of the light absorbing layer 12' and the absorption axis 16a of the polarizer 16 are parallel to each other. If the state of polarization successfully reaches point B3 which falls on a position of extension on the S1 axis beyond point A, as a result of passage through the light absorbing layer 12', the state of polarization may be moved to extinction point C after passage through the retardation layer 14. In the embodiment illustrated in FIG. 2B, the state of polarization is necessarily moved from point B2 beyond extinction point C up to a point which falls on midway (point B2 in FIG. 2B) to point A, as a result of transition cause by the light absorbing layer, and is then further moved from point B2 to point B3 which is a point of extension beyond point A on the S1 axis, as a result of transition again by the light absorbing layer. The degree of transition in the state of polarization caused by the light absorbing layer depends on $\Delta k(\lambda)$ of the light absorbing layer, so that the light absorbing layer 12' used in the embodiment illustrated in FIG. 2B necessarily has a value of $\Delta k(\lambda) \times d$ larger than that of light absorbing layer 12 used in the embodiment illustrated in FIG. 1B.

In either embodiment described in the above, the retardation layer preferably has so-called reversed wavelength dispersion characteristics of retardation in plane, Re, in the visible light region, characterized by that Re becomes larger as the wavelength becomes longer. In other words, the relation of Re(450)<Re(550)<Re(630) is preferably satisfied. This is because the retardation layer having reversed wave dispersion characteristics of Re is more likely to be optimized in the optical characteristics over the entire range of visible light region, simply by optimizing them at around 550 nm which is at the center of the visible light region. More ideally, Re($\lambda$) of the retardation layer divided by wavelength $\lambda$ gives a constant value. In this embodiment, the transition on the above-described Poincaré sphere may always be similar over the visible light region irrespective of wavelength, and thereby also the problem of color shift anticipated in oblique directions may be resolved.

Similarly, as an example with Nz<0.5, FIG. 3 illustrates loci of the state of polarization of obliquely-incident light on the Poincaré sphere, in an embodiment based on combination of a retardation film having an Nz value of 0 and Re(550) of 270 nm, and a polarizer, wherein the in-plane slow axis of the retardation layer aligns in parallel with the absorption axis of the polarizer. As illustrated in FIG. 3, it may be understood that also the embodiment using the retardation layer characterized by Nz<0.5 yields an effect similar to that achieved by the embodiment using the retardation layer characterized by Nz>0.5.

Next, preferable characteristics and methods of preparing the individual components of the optical compensation film of the present invention will be explained.

1.-1 Light Absorbing Layer

The optical compensation film of the present invention has the light absorbing layer which shows absorption anisotropy in the plane (x-y plane) thereof with respect to light of wavelength $\lambda$ nm in the visible light region. More specifically, the in-plane absorption coefficients $kx(\lambda)$ and $ky(\lambda)$ satisfy the relation of $ky(\lambda) < kx(\lambda)$. The absorption coefficient k herein is also called attenuation index, indicating to what degree of energy of light can be absorbed in a substance. In general, the real component n of the complex refractive index means so-called refractive index, and the imaginary component k means the absorption coefficient. It is to be noted that "k" described in the description is a different physicality value from so-called attenuation coefficient $\alpha$. "Attenuation index" and "attenuation coefficient" are described in detail in "Principles of Optics, $7^{th}$ (expanded) edition", 4.11.2 "Beam propagation in an absorbing medium", p. 218-219, written by Max Born and Emil Wolf. The difference in absorption coefficient, $\Delta k(\lambda)(=kx(\lambda)-ky(\lambda))$, can be measured by using "Axoscan" manufactured by Axometrics.

As described in the above, a preferable range of $\Delta k(\lambda)(=kx(\lambda)-ky(\lambda)) \times d$ of the light absorbing layer varies depending, for example, on the Nz value of the retardation layers to be combined, and the number of light absorbing layers allowing light to pass therethrough. After extensive investigations, the present inventors found out that, if the light absorbing layer satisfies the relation of 22 nm<$\Delta k(550) \times d$<430 nm, the viewing angle dependence of the polarizers may be moderated to some degree in all embodiments, by using the optical compensation film of the present invention. In the embodiment illustrated in FIG. 1A, in which only one of the pair of polarizers is compensated by the optical compensation film of the present invention, the relation of 22 nm$\leq \Delta k(550) \times d \leq$215 nm is preferably satisfied, and 43 nm$\leq \Delta k(550) \times d \leq$172 nm is more preferably satisfied. In the embodiment illustrated in FIG. 2B, in which both of the pair of polarizers are compensated by the the optical compensation films of the present invention, the relation of 65 nm$\leq \Delta k(550) \times d \leq$215 nm is preferably satisfied, and 86 nm$\leq \Delta k(550) \times d \leq$172 nm is more preferably satisfied. When $\Delta k(550)$ is larger than 215 nm, the transmittance in the white state may be insufficient, which is not preferable. Thus, $\Delta k(550)$ is preferably equal to or less than 215 nm.

The light absorbing layer shows in-plane absorption anisotropy similarly to general polarizers. A general polarizer has a $\Delta k(550) \times d$ of 260 to 505 nm or around, which may be converted into the degree of polarization of from 99.5% to 99.998%, from 0.995 to 0.99998. In contrast, the above-described light absorbing layer has a $\Delta k(550) \times d$ value of 22 to 215 nm or around, which may be converted into the degree of polarization P of as small as 0.246 to 0.986. Considering that the thickness of the light absorbing layer falls in the range from 1 μm to 100 μm or around, $\Delta k(550)$ is preferably adjusted to $2.2 \times 10^{-4}$ to 0.215 or around. The degree of polarization P of the light absorbing layer is preferably 0.241 to 0.986, and more preferably 0.456 to 0.962.

The light absorbing layer may be prepared similarly to general absorptive polarizers. For example, general polarizers may be prepared by allowing a polymer film, such as polyvinyl alcohol film, to adsorb iodine or a dichroic dye, and by stretching the film thereafter, or at the same time with the adsorption. The polymer film, such as polyvinyl alcohol film, which satisfies the above-described characteristics and is applicable to the light absorbing layer, may be prepared by appropriately adjusting the amount of absorption and the factor of stretching.

The light absorbing layer may be formed also by coating. For example, when a coating liquid containing a liquid crystal and a dye is applied to the surface so as to align the liquid crystal molecules, also the dye molecules are aligned so that their longitudinal axes are along with the longitudinal axes of the liquid crystal molecules. By fixing this state via curing, the light absorbing layer having the in-plane absorption anisotropy may be obtained. The liquid crystal may be either of a low-molecular-weight compound, and a polymer compound having, in the side chains thereof, residues of the low-molecular-weight compound. When the low-molecular-weight compound is adopted, it may be preferable to use a low-molecular-weight liquid crystal compound having polymerizable groups, and/or to preliminarily add a curing component such as polymerizable monomer, cross-linking agent or the like to the coating liquid, in view of enabling curing.

The liquid crystal which can be used for preparing the light absorbing layer is note limited. Preferably, the liquid crystal may be selected from rod-like liquid crystals or polymers having a residue of rod-like liquid crystal in side chain. Examples of the liquid crystal include thermotropic liquid crystals exhibiting a nematic or smectic phase, ionic liquid crystals, lyotropic liquid crystals, and chromonic liquid crystals. Examples of the rod-like liquid crystal which can be used in the invention include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Examples of the rod-like liquid crystal compounds further include metal complexes of liquid crystal compounds. Liquid crystal polymers having one or more repeating units including a rod-like liquid crystal structure can also be used in the present invention. Namely, the rod-like crystal compounds bonded to a polymer may be use in the present invention. Rod-like liquid crystal compounds are described in fourth, seventh and eleventh chapters of "Published Quarterly Chemical Review vol. 22 Chemistry of Liquid Crystals (Ekisho no Kagaku)" published in 1994 and edited by Japan Chemical Society; and in third chapter of "Handbook of liquid Crystal Devices (Ekisyo Debaisu Handobukku)" edited by the 142th committee of Japan Society for the Promotion of Science.

Regarding low-molecular weight liquid crystal compounds, they desirably have one or more polymerizable groups for fixing themselves in an alignment state. Unsaturated polymerizable groups and epoxy groups are preferable as a polymerizable group, unsaturated polymerizable groups are more preferable, and ethylene-base unsaturated polymerizable groups are especially preferable. Examples of the liquid crystal compound having unsaturated polymerizable group(s), which can be used in the invention, include, but are not limited to, those shown below.

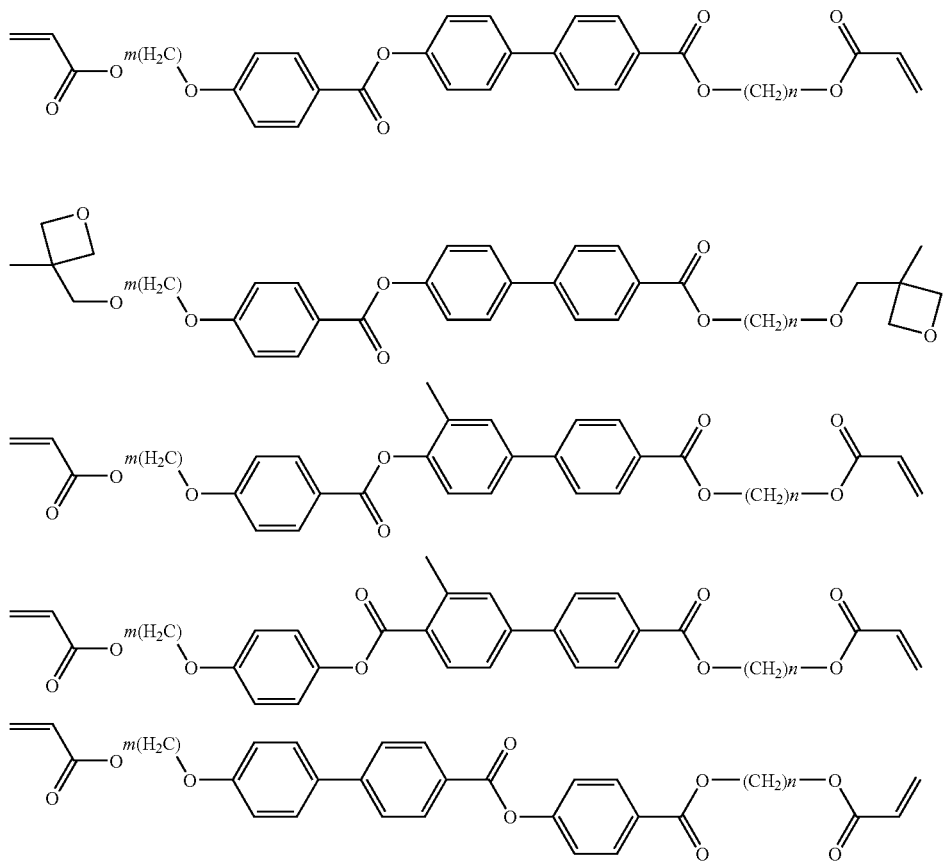

-continued
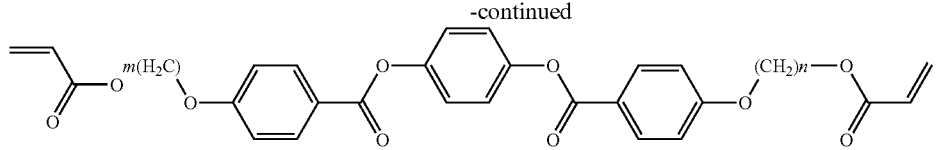
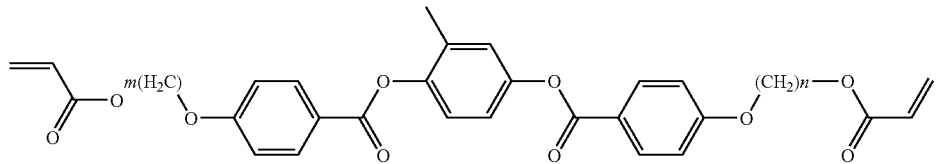
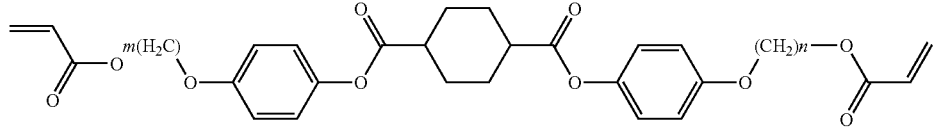
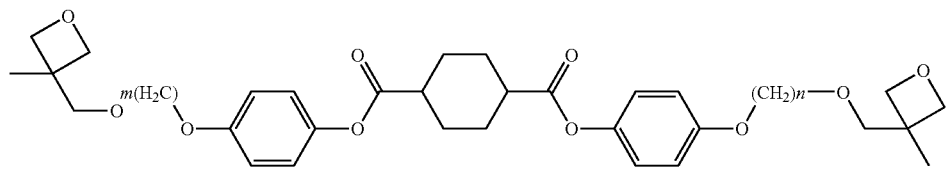
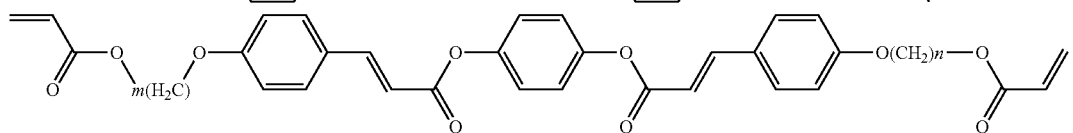
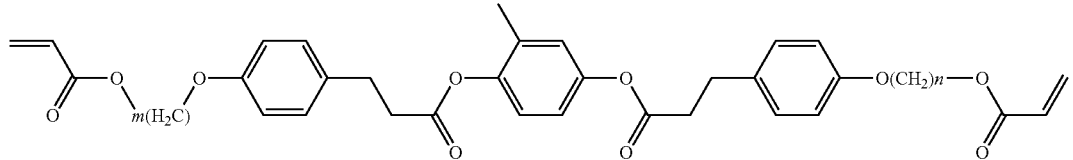
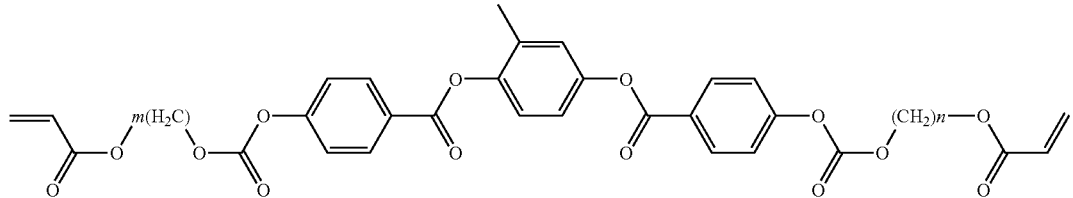
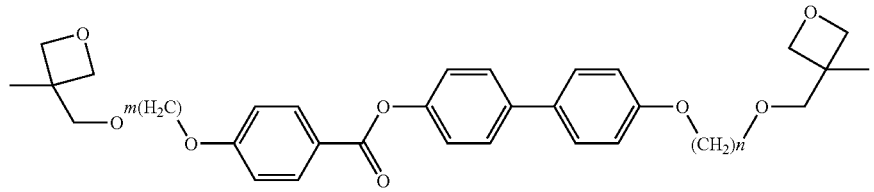
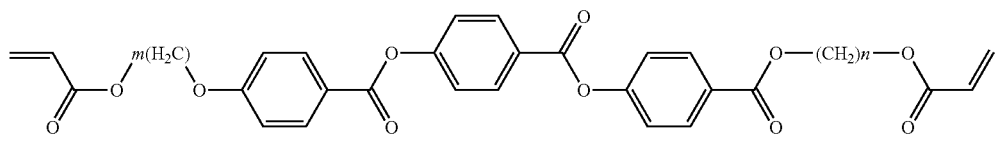
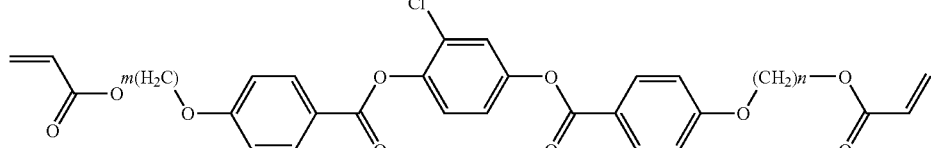
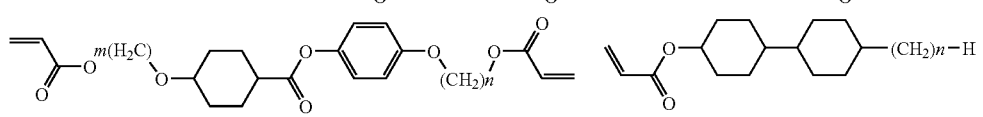

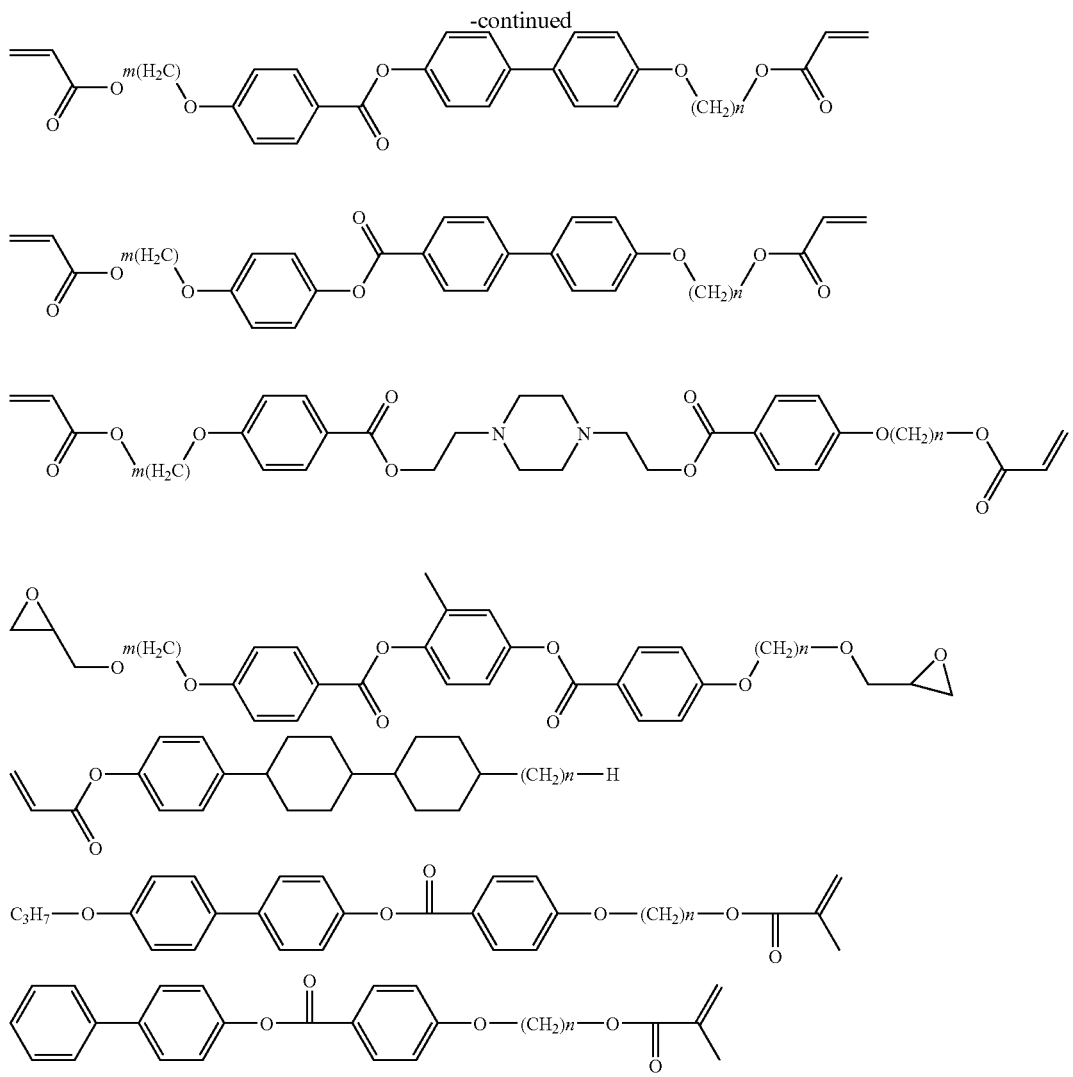

In the above mentioned method, dichroic dyes, whose absorbing properties along the long and short axes are different from each other, are preferably used. The dichroic dyes in any aggregate state such as crystal state, association state and pigment state may be used so far as they show a dichroic property. Regarding the size of the aggregate, the long diameter is preferably from 5 nm to 1 μm, more preferably from 10 nm to 400 nm, and even more preferably from 20 nm to 100 nm. The chromophore group of the dye is not limited. Examples of the dye include azo dyes, anthraquinone dyes, perylene dyes, mericyanine dyes, azomethine dyes, phthaloperylene dyes, indigo dyes, azulene dyes, dioxadine dyes, polythiophene dyes, and phenoxazone dyes. Azo dyes, anthraquinone dyes and phenoxazone dyes are preferable; and anthraquinone dyes and phenoxazone dyes (phenoxadine-3-on) are more preferable.

Examples of the azo dye include mono-azo, bis-azo, tris-azo, tetrakis-azo and pentakis-azo dyes; and mono-azo, bis-azo, and tris-azo dyes are preferable. Examples of the ring structure in the azo dye include aromatic group such as benzene ring and naphthalene ring, and hetero-atom ring such as quinoline ring, pyridine ring, thiazole ring, benzotriazole ring, oxazole ring, benzoxazole ring, imidazole ring, benzoimidazole ring and pyrimidine ring.

The anthraquinone dye preferably has one or more substituent containing an oxygen, sulfur or nitrogen atom. Examples of such a substituent include alkoxy, aryloxy, alkylthio, alkylamino, and arylamino. The number of the substituent in the anthraquinone dye is not limited; di-, tri-, and tetrakis-substituted compounds are preferable; and di- and tri-substituted compounds are especially preferable. The substitution position is not limited; and 1,4-disubstituted, 1,5-disubstituted, 1,4,5-trisubstituted, 1,2,4-trisubstituted, 1,2,5-trisubstituted, 1,2,4,5-tetrasubstituted, and 1,2,5,6-tetrasubstituted compounds are preferable.

The phenoxazone dye (phenoxadine-3-on) preferably has one or more substituent containing an oxygen, sulfur or nitrogen atom. Examples of such a substituent include alkoxy, aryloxy, alkylthio, alkylamino, and arylamino.

Examples of the dye, which can be used in the invention, include but are not limited to, those shown below.

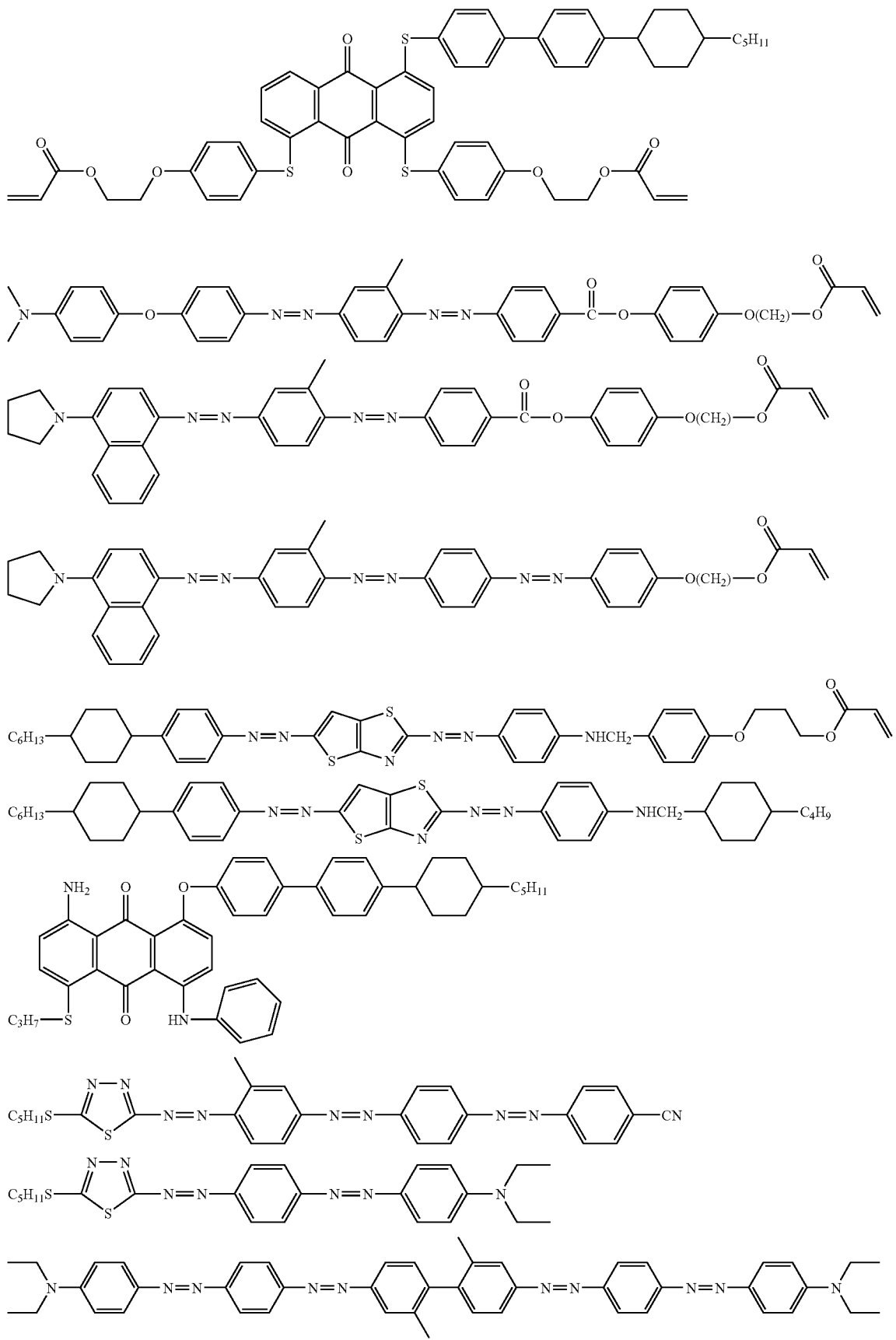

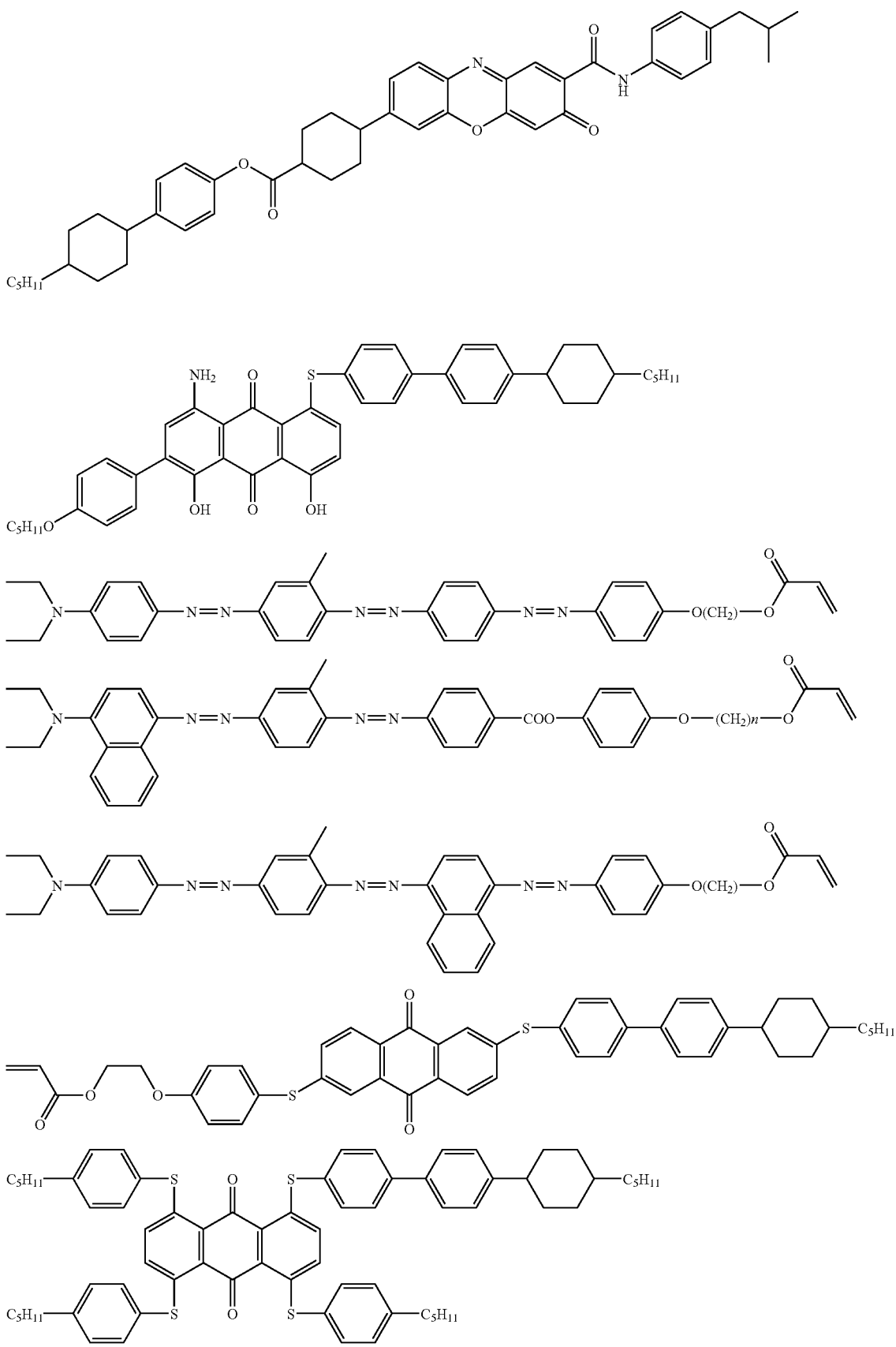

-continued

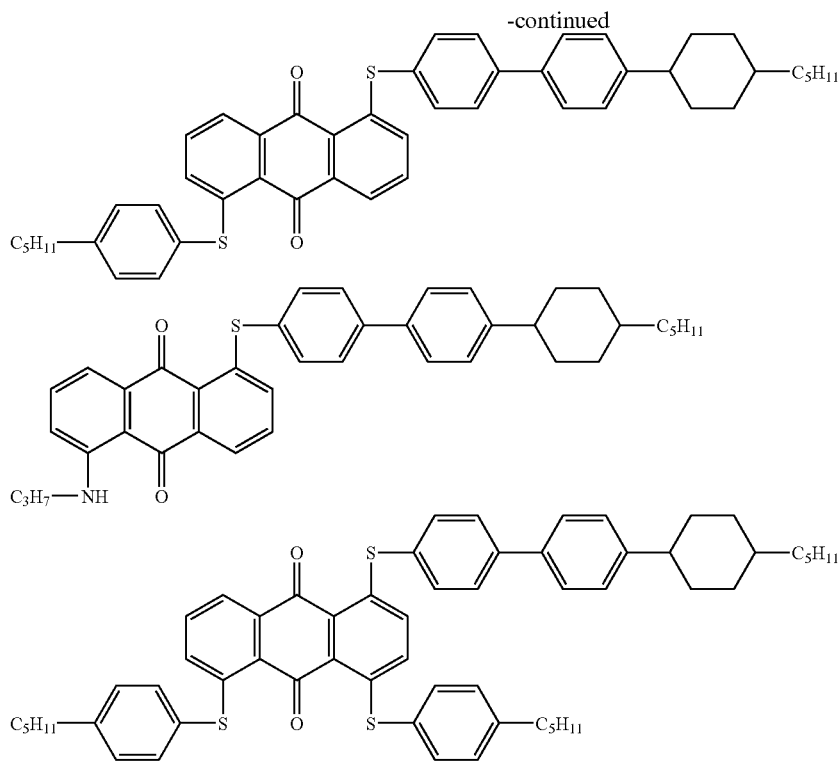

1.-2 Retardation Layer

The optical compensation film of the present invention contains at least a retardation layer having the in-plane slow axis. The retardation layer may be optically monoaxial or biaxial, and may be composed of a single layer or a plurality of layers. One feature of the present invention is to compensate the viewing angle dependence of the polarizers, making use of the retardation layer having an Nz value of other than 0.5, that is, having an Nz value exceeding 0.5 or smaller than 0.5. In particular, the Nz value exceeding 0.5 has been achieved typically by various stretched films which are readily available, and the films may preferably be adopted to the embodiments illustrated in FIGS. 1A, 1B and FIGS. 2A, 2B.

The retardation layer preferably shows so-called reversed wavelength dispersion characteristics of retardation in plane, Re, over the visible light region, as described in the above. The reversed wavelength dispersion characteristics shown by the retardation layer is preferable not only because the leakage of light which has otherwise occurred in oblique directions in the black state may be moderated, but also because the color shift may be moderated. More specifically, the retardation layer may preferably be characterized by Re(450)<Re(550)<Re(630), and ideally by Re(450)/450=Re(550)/550=Re(630)/630, which means that the individual Re values divided by the correspondent wavelength give the same value.

The retardation layer preferably has retardation in plane of approximately λ/2, because, as illustrated in FIG. 1B and FIG. 2B, the state of linear polarization of light passed through the polarizer, or the state of polarization represented by point A on the S1 axis in FIG. 1B and FIG. 2B, may be moved to other points on the S1 axis (point B and point B1 in the individual drawings). More specifically, Re(550) of the retardation layer is preferably 206 to 344 nm, and more preferably 240 to 309 nm.

One example of the retardation layer to be used in the invention is a polymer film. When a polymer film is used as the retardation layer in the invention, it can be also used as a support for the light absorbing layer prepared by coating. Examples of the polymer film include various polymer films containing one or more selected from polycarbonate-base polymers; polyesters such as polyethylene terephthalate and polyethylene naphthalate; acryl-base polymers such as polymethyl methacrylate; styrene-base polymers such as polystyrene and acrylonitrile-styrene copolymers (AS polymers); polyolefins such as polyethylene and polypropylene; olefin-base polymers such as ethylene-propylene copolymers; vinyl chloride-base polymers; amide-base polymers such as nylon and aromatic polyamide; imide-base polymers; sulfone-base polymers; polyethersulfone-base polymers; polyetherketone-base polymers; polyphenylene sulfide-base polymers; vinylidene chloride base-polymers; vinyl alcohol-base polymers; vinyl butyral-base polymers; aryllylate-base polymers; polyoxymethylene-base polymers; and epoxy-base polymers.

As the retardation layer, an optically-monoaxial polymer film, having an Nz value of 1, may be used. Examples of the optically-monoaxial polymer film, having an Nz value of 1, include commercially available polycarbonate films such as "Pure Ace WR" produced by TEIJIN. The optically-monoaxial polymer may be prepared according to any known method such as melt-extrusion method and a solvent casting method. In terms of reducing the variation of the film-thickness or improving the film-appearance, a solvent casting method is preferable. More specifically, using a polycarbonate as a material, the polymer film may be prepared as follows. The polycarbonate is dissolved in an organic solvent such as methylene chloride or dioxolane to prepare a solution, and then the solution is cast on a band to form an un-stretched film. Then, the un-stretched film is stretched according to a method described below to form a positive A-plate type retardation film having desired retardation. Examples of the stretching method include various continuous stretching method such as a roll-longitudinal monoaxial stretching method employing rolls having a different roll-speed from each other; a tenter-longitudinal monoaxial stretching method employing pins or clips, having a different speed in the machine direction from each other, for grasping the edges in the width direction of the film; and a tenter-lateral monoaxial stretching employing a tenter whose width is decreased gradually. In terms of improving the uniformity of film characteristics, a roll-longitudinal monoaxial stretching method is preferable.

Any optically anisotropic layer(s) formed of a liquid crystal composition may be used as the retardation layer in the invention. The liquid crystal composition preferably contains any rod-like liquid crystal compound(s). Examples of the rod-like liquid crystal compound applicable to the present invention include azomethines, azoxys, cyanobiphenyls, cyanophenyl esters, benzoate esters, cyclohexane carboxylic acid phenyl esters, cyanophenyl cyclohexanes, cyano-substituted phenyl pyrimidines, alkoxy-substituted phenyl pyrimidines, phenyl dioxanes, tolans and alkenyl cyclohexyl benzonitriles. Examples of the rod-like liquid crystal compounds further include metal complexes of liquid crystal compounds. Liquid crystal polymers having one or more repeating units including a rod-like liquid crystal structure can also be used in the present invention. Namely, the rod-like crystal compounds bonded to a polymer may be use in the present invention. Rod-like liquid crystal compounds are described in fourth, seventh and eleventh chapters of "Published Quarterly Chemical Review vol. 22 Chemistry of Liquid Crystals (Ekisho no Kagaku)" published in 1994 and edited by Japan Chemical Society; and in third chapter of "Handbook of liquid Crystal Devices (Ekisyo Debaisu Handobukku)" edited by the 142th committee of Japan Society for the Promotion of Science. The birefringent ratio of the rod-like liquid crystal compound to be used in the invention is preferably from 0.001 to 0.7. And the rod-like liquid crystal compound to be used in the invention preferable has a symmetric molecular structure relative to the short axis. For having such a molecular structure, the rod-like liquid crystal compound to be used in the invention preferably has a polymerizable group at each terminal portion of the molecular structure.

1.-3 Method of Manufacturing Optical Compensation Film

An exemplary method of preparing the optical compensation film of the present invention is as follows. First, a polymer film which satisfies the above-described characteristics as the retardation layer is obtained, a coating liquid containing a liquid crystal and a dichroic dye is applied to the surface of the film, the coated layer is heated if necessary, the solvent is removed by drying, the liquid crystal molecules are aligned, and also the dichroic dye molecules are aligned in association therewith. The coated layer is then cured by cooling so as to allow phase transition to a solid phase to proceed therein, or by optionally allowing a polymerization function to proceed therein, to thereby form a hardened layer. The hardened layer shows in-plane absorption anisotropy by virtue of the dichroic dye molecules contained therein, while being fixed in horizontal alignment, and may therefore function as the light absorbing layer. The layer may be adjusted to have a desired value of $\Delta k(\lambda) \times d$, by appropriately selecting species and concentration of the dichroic dye used for preparing the coating liquid, the amount of coating of the coating liquid, and so forth.

If the coating liquid is applied to the surface of an alignment film, the liquid crystal molecules and the dye molecules may be brought into a desired state of alignment. This is desirable from the viewpoint of stably forming the light absorbing layer which can express desired characteristics. In this method, a horizontal alignment film is preferably used, and the alignment film having a rubbed surface is preferably used. Examples of applicable alignment films include those of polyimide base and polyvinyl alcohol base, used for preparing liquid crystal cells and optical compensation films. The direction of rubbing may lie orthogonally to the in-plane slow axis of the retardation layer.

Alternatively, also general absorptive polarizers may be adoptable as the light absorbing layer. For example, any polarizing film containing a binder, and iodine or a dichroic dye may be adoptable. Since the light absorbing layer has a degree of polarization smaller than that of the generally-adopted absorptive polarizers, so that conditions of preparing, for example, are necessarily controlled so as to allow weaker expression of the polarizing performance. The absorptive polarizer expresses the polarizing performance by virtue of molecules of iodine or the dichroic dye aligned in the binder. More specifically, molecules of iodine or dichroic dye align along the binder molecules, or the dichroic dye unidirectionally align based on self-organization such as exhibited by liquid crystals, and thereby the polarizing performance may be expressed. Commercially-available absorptive polarizers are generally prepared by immersing a stretched polymer film into a solution bath of iodine or dichroic dye, so as to allow iodine or the dichroic dye to impregnate into the binder. For example, by adjusting conditions of stretching of the polymer film, concentration of iodine or dichroic dye in the solution, conditions of impregnation and so forth, the absorptive polarizer having characteristics required for the light absorbing layer may be prepared, and maybe adoptable as the light absorbing layer.

2. Polarizing Plate

The polarizing plate of the present invention has at least a polarizer and the optical compensation film of the present invention. The polarizing plate of the present invention shows wide-viewing-angle characteristics, since the viewing angle dependence is reduced by the optical compensation film. In the polarizing plate of the present invention, the polarizer and the optical compensation film are stacked so that the absorption axis of the polarizer and the in-plane absorption axis of the light absorbing layer contained in the optical compensation film are parallel to each other. By virtue of the bonding of the both in this relation, the state of polarization of light passing through the light absorbing layer, represented by an arbitrary point on the S1 axis, may be moved along the S1 axis towards point A, as illustrated in the FIG. 1B and FIG. 2B.

One example of the polarizing plate of the present invention may contain a protective film, a polarizer, and the optical compensation film of the present invention, wherein the optical compensation film has the retardation layer which is composed of a polymer film, and the polymer film is used also as a protective film of the polarizer.

As the polarizer, general absorptive polarizers may be adoptable. For example, a polarizing film composed of a binder, iodine or dichroic dye may be adoptable. Iodine or the dichroic dye in the linear polarizing film expresses the polarizing performance by aligning itself in the binder. More specifically, molecules of iodine or dichroic dye align along the binder molecules, or the dichroic dye unidirectionally align based on self-organization such as exhibited by liquid crystals, and thereby the polarizing performance may be expressed. At present, the commercially-available absorptive polarizers are generally manufactured by immersing a stretched polymer film into a solution bath of iodine or dichroic dye, so as to allow iodine or the dichroic dye to impregnate into the binder. The polarizing film prepared as described in the above may be adoptable as the polarizer.

The polarizer is preferably bonded with a protective film for protecting the polarizer on the back surface thereof (the surface not bonded with the optical compensation film of the present invention. Films composed of various polymer materials, and have conventionally been adopted to the protective film of the polarizer, may be used without special limitations. Examples of the polymer materials may be same as the above-described polymer materials adoptable to the retardation layer.

3. Liquid Crystal Display Device

The present invention relates also to a liquid crystal display device having at least one polarizing plate of the present invention. Since the polarizing plate of the present invention shows wide-viewing-angle characteristics as described in the above, so that the leakage of light which has otherwise occurred in oblique directions in the black state, due to viewing angle dependence of the polarizing plates, may be moderated, by using the polarizing plate of the present invention. The polarizing plate of the present invention may be adoptable to various modes of liquid crystal display devices such as TN (Twisted Nematic), IPS (In-Plane Switching), OCB (Optically Compensatory Bend), VA (Vertically Aligned) and ECB (Electrically Controlled Birefringence)—mode liquid crystal display devices.

Figure 4A:
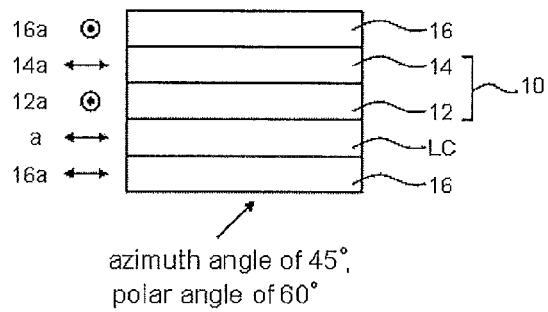
FIG. 4A is a schematic sectional view of one embodiment of an IPS-mode liquid crystal display device having the optical compensation film of the present invention.
Figure 4B:
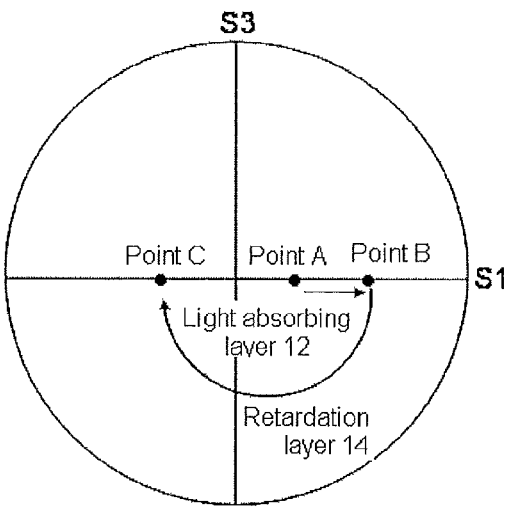
FIG. 4B is a schematic drawing of the Poincaré sphere used for explaining loci of state of polarization of incident light coming in oblique directions in this embodiment.

Among others, the polarizing plate of the present invention may raise an excellent effect when it is adopted to liquid crystal display devices based on the IPS mode, and FFS (Fringe Field Switching) mode which is one variety of the IPS mode. FIG. 4A illustrates an embodiment having the polarizing plate of the present invention adopted as the polarizing plate, on the observer's side, of an IPS-mode liquid crystal display device, and FIG. 4B illustrates loci of the state of polarization on the Poincaré sphere, given by light obliquely enter the liquid crystal display device of this embodiment. As illustrated in FIG. 4A, the liquid crystal display device of this embodiment has a pair of polarizers 16, and an IPS-mode liquid crystal cell LC disposed therebetween, wherein the polarizer 16 on the observer's side is integrated with the optical compensation film of the present invention 10 and expanded in the viewing angle. A protective film generally provided to the external of the polarizer 16 on the observer's side is not illustrated in FIG. 4A. On the other hand, the polarizer 16 on the back light side is adopted to the liquid crystal display device, generally as the polarizer having the protective films provided on both surfaces thereof, wherein the protective films are again not illustrated in FIG. 4A.

As illustrated in FIG. 4A, the absorption axis 16a of the polarizer 16 on the back light side and the in-plane slow axis "a" in the black state of the liquid crystal cell LC are parallel to each other, and the absorption axis 16a of the polarizer 16 on the observer's side and the in-plane slow axis "a" in the black state of the liquid crystal cell LC are orthogonal to each other. By virtue of this arrangement, the axis of polarization may be compensated by the optical compensation film 10, without being affected by birefringence of the IPS-mode liquid crystal cell LC, which is a horizontally-aligned liquid crystal layer.

Point A in FIG. 4B represents a state of polarization of an obliquely-incident light which passed through the polarizer 16 on the back light side in the black state, and then passed through the IPS-mode liquid crystal cell LC in the black state. Thereafter, as a result of passage through the light absorbing layer 12, the state of polarization of the incident light moves to point B beyond point A on the S1 axis, and further moves to point C, which is an extinction point of the polarizer 16 on the observer's side, as a result of passage through the retardation layer 14. In other words, the state of polarization of light which otherwise occurs in oblique directions may be moved to extinction point C, and leakage of light may be moderated. In order to allow the transition illustrated in FIG. 4B, the light absorbing layer 12 has a $\Delta k(550) \times d$ of 22 to 415 nm, and the retardation layer 14 satisfies the relation of $0.5 < Nz < 2$, and has a $Re(550)$ of 206 to 344 nm. Note that FIG. 4B illustrates an embodiment in which the light absorbing layer satisfies $\Delta k(550) \times d = 65$ nm, and the retardation layer 14 satisfies $Nz=1$ and $Re(550)=270$ nm.

Not only by the embodiment illustrated in FIGS. 4A and 4B adopting the polarizing plate of the present invention to the polarizing plate on the observer's side, a similar effect may be obtained also by an embodiment adopting the polarizing plate of the present invention to the polarizing plate on the back light side. A similar effect of adoption of the polarizing plate of the present invention may be obtained still also by an FFS-mode display device, which is one variety of the IPS-mode display device, because the state of alignment of liquid crystal in the black state is similar to that in the IPS-mode display device.

EXAMPLES

Features of the present invention will be explained below in further detail, referring to Examples and Comparative Examples. Note that materials, amount of use, ratio, details of processes, procedures of processes and so forth described in Examples may be modified without departing from the spirit of the present invention. Therefore, it is to be understood that the scope of the present invention is not limitedly interpreted by the specific examples described below.

Example 1

Preparation of Optical Compensation Film of the Present Invention

<Preparation of Retardation Film>

Two sheets of modified polycarbonate film (trade name: Pure Ace WR, from Teijin, Ltd.) stretched to have a thickness of 77 μm were obtained, and were bonded using an adhesive while aligning the in-plane slow axes thereof in parallel with each other, to thereby prepare a retardation film. The retardation film was found to show wavelength dispersion characteristics according to which the index ellipsoid satisfies the relation of $nx > ny = nz$, and retardation value representing optical path difference between the abnormal light and the normal light decreases on the shorter wavelength side, that is, reversed wavelength dispersion characteristics of retardation in-plane, Re. The film was found to have $Re(550)$ of 270 nm, Nz of 1, $Re(450)/Re(550)$ of 0.82, and $Re(630)/Re(550)$ of 1.05.

<Preparation of Lightabsorbing Layer>

A glass substrate was washed and dried, a commercially-available polyimide alignment film (SE-130, from Nissan Chemical Industries, Ltd.) was formed according to a coating method using a wire bar, the coated film was heated at 250° C. for one hour, allowed to cool, and rubbed at room temperature. Next, the liquid crystal compound (1) shown below, and a predetermined amount, in parts by mass relative to 100 parts by mass of the liquid crystal compound (1), of each of the dyes 1 to 5, were dissolved in chloroform, to thereby prepare each coating liquid. The coating liquid was applied to the surface of the alignment film using a wire bar. The coated film was heated in a thermostat chamber at 180° C. for one minute, and then gradually cooled to room temperature, to obtain each light absorbing layer.

It was confirmed from observation under a polarization microscope that all of thus-formed light absorbing layers had molecules uniformly aligned therein, horizontally to the substrate.

Each of the light absorbing layers formed on the glass substrate was then transferred onto the retardation film prepared in the above, while placing an adhesive layer in between, to thereby prepare each optical compensation film. The light absorbing layer was transferred so as to align the absorption axis thereof orthogonally to the axis of stretching, that is, a slow axis, of the retardation film.

Liquid Crystal Compound (1)

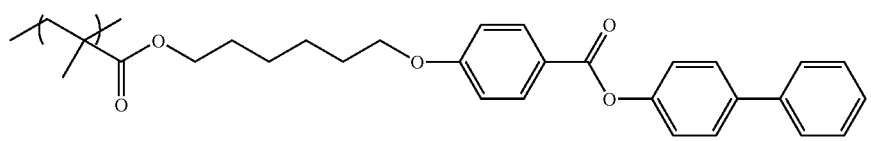

Dye 1

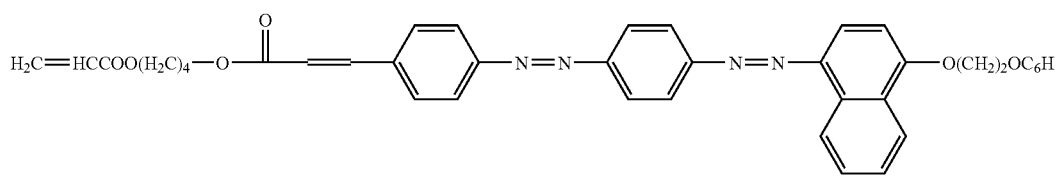

Dye 2

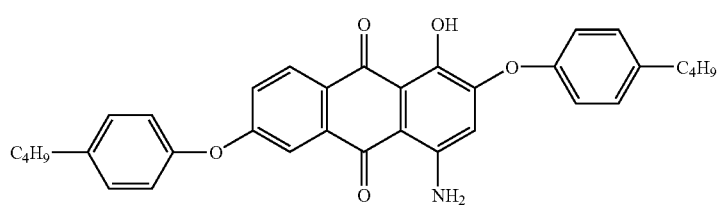

Dye 3

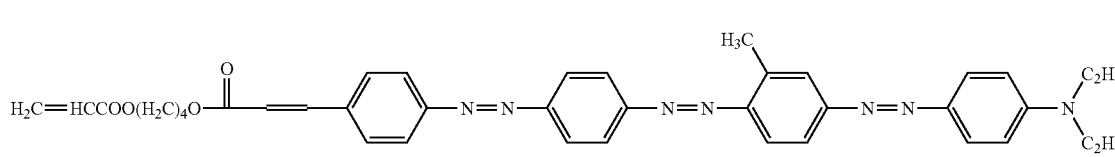

Dye 4

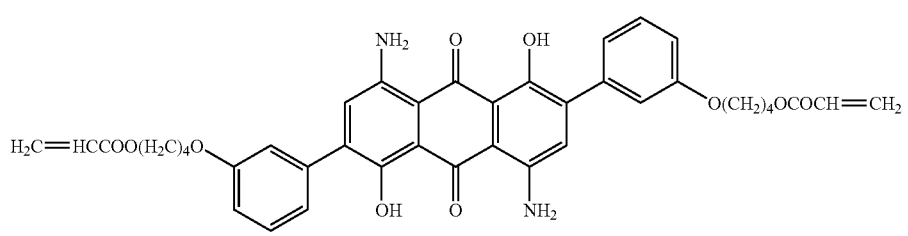

Dye 5

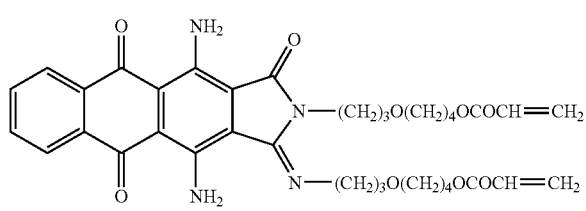

TABLE 1

| Optical Compensation Film No. | Dye 1 | Dye 2 | Dye 3 | Dye 4 | Dye 5 | Thickness μm |
|---|---|---|---|---|---|---|
| (a) | 1.0 | 0.5 | 0.5 | 0.7 | 0.7 | 2 |
| (b) | 1.6 | 0.8 | 0.8 | 1.1 | 1.1 | 2 |
| (c) | 1.6 | 0.8 | 0.8 | 1.1 | 1.1 | 3 |
| (d) | 1.3 | 0.6 | 0.6 | 0.9 | 0.9 | 5 |
| (e) | 1.9 | 0.9 | 0.9 | 1.4 | 1.4 | 5 |
| (f) | 1.6 | 0.8 | 0.8 | 1.1 | 1.1 | 8 |
| (g) | 2.0 | 1.0 | 1.0 | 1.4 | 1.4 | 8 |

The optical compensation films having the light absorbing layers which show a variety of in-plane absorption anisotropy were respectively prepared as described in the above. The in-plane absorption anisotropy of the light absorbing layer was measured using AxoScan, a polarimeter from Axometrics, Inc. Results of measurement of Δk×d of thus-obtained optical compensation films are shown in the table below.

TABLE 2

| Optical compensation Film No. | Light absorbing layer | |
|---|---|---|
| | Δk × d [nm] | Degree of polarization P |
| (a) | 22 | 0.241 |
| (b) | 43 | 0.456 |
| (c) | 65 | 0.628 |
| (d) | 86 | 0.755 |
| (e) | 129 | 0.901 |
| (f) | 172 | 0.962 |
| (g) | 215 | 0.986 |

Example 2

Preparation and Evaluation of Wide-Viewing-Angle Polarizing Plate of the Present Invention <Preparation of Polarizer>

A stretched polyvinyl alcohol film was allowed to adsorb iodine, to thereby prepare a polarizer made of polyvinyl alcohol film. The absorption anisotropy was measured using AxoScan, a polarimeter from Axometrics, Inc. The polarizer was found to have an in-plane absorption anisotropy Δk×d of 486 nm, and a degree of polarization of 99.997%.

<Preparation of Polarizing Plate>

Each of Optical compensation films (a) to (g) was respectively bonded to one surface of the polarizer (polyvinyl alcohol film) prepared in the above, using a polyvinyl alcohol-base adhesive. More specifically, the back surface (the surface on the side having no light absorbing layer) of the retardation film was bonded to the surface of the polarizer using an adhesive so that the absorption axis of the polarizer and the in-plane absorption axis of the light absorbing layer are parallel to each other.

Next, a commercially-available cellulose triacetate film (Fujitac TD80UF, from FUJIFILM Corporation) was saponified, and was then bonded, as a protective film, to the other surface of the polarizer using a polyvinyl alcohol-base adhesive.

Wide-viewing-angle polarizing plates (a) to (g), respectively having Optical compensation films (a) to (g), were prepared in this way.

For Comparative Example, a comparative polarizing plate was prepared by bonding a commercially-available cellulose triacetate film (Z-Tac, from FUJIFILM Corporation), in place of the optical compensation film, to the polarizer. The commercially-available cellulose triacetate film herein was bonded so that the in-plane slow axis thereof was parallel to the absorption axis of the polarizer. The properties of the commercially-available cellulose triacetate film are as follows: Re=0.3 nm and Rth=3 nm, which indicates that both of Re and Rth of the film are nearly equal to 0.

<Evaluation 1>

Two sheets each of Wide-viewing-angle polarizing plates (a) to (g) were obtained, disposed in the crossed Nicol arrangement, and state of transmission of light was examined so as to evaluate the viewing angle characteristics in the black state. In other words, the viewing angle characteristics in the black state was evaluated, according to the arrangement illustrated in FIG. 2A. Two sheets of the comparative polarizing plates prepared in the above were used for Comparative Example. A measuring instrument (EZ-Contrast 160D, from ELDIM) was used.

TABLE 3

| Polarizing plate No. | Light absorbing layer Δk × d [nm] | Transmittance in the black state in oblique direction[1] [%] |
|---|---|---|
| (a) | 22 | 4% |
| (b) | 43 | 2% |
| (c) | 65 | 0.80% |
| (d) | 86 | 0.20% |
| (e) | 129 | 0.01% |
| (f) | 172 | 0.10% |
| (g) | 215 | 0.30% |
| Comparative Example | — | 1% |

[1]Transmittance in the black state measured in the direction at azimuth angle of 45° and at polar angle of 60°.

It can be understood from the results shown in the above that the embodiments, using each of Wide-viewing-angle polarizing plates (a) to (g) of the present invention as a pair of polarizing plates, showed transmittance in the black state in the oblique direction smaller than in Comparative Example over the range of Δk×d of the light absorbing layer from 65 to 215 nm, and that the transmittance in the black state in the oblique directions was minimized when the light absorbing layer has Δk×d at around 129 nm.

<Evaluation 2>

One sheet each of Wide-viewing-angle polarizing plates (a) to (g) was obtained, disposed together with a conventional polarizing plate (the comparative polarizing plate manufactured in the above was used herein) in the crossed Nicol arrangement, and state of transmission of light was examined so as to evaluate the viewing angle characteristics in the black state. In other words, the viewing angle characteristics in the black state was evaluated, according to the arrangement illustrated in FIG. 1A. The measuring instrument (EZ-Contrast 160D, from ELDIM) was used. Two sheets of the comparative polarizing plates manufactured in the above were used for Comparative Example.

TABLE 4

| Polarizing plate No. | Light absorbing layer Δk × d [nm] | Transmittance in the black state in oblique direction[1] [%] |
|---|---|---|
| (a) | 22 | 0.30% |
| (b) | 43 | 0.01% |
| (c) | 65 | 0.008% |

TABLE 4-continued

| Polarizing plate No. | Light absorbing layer Δk × d [nm] | Transmittance in the black state in oblique direction*[1] [%] |
|---|---|---|
| (d) | 86 | 0.009% |
| (e) | 129 | 0.02% |
| (f) | 172 | 0.04% |
| (g) | 215 | 0.06% |
| Comparative Example | — | 1% |

*[1]Transmittance in the black state measured in the direction at azimuth angle of 45° and at polar angle of 60°.

It can be understood from the results shown in the above that the embodiments, using each of the wide-viewing-angle polarizing plates (a) to (g) of the present invention as a single polarizing plate, showed transmittance in the black state smaller than in Comparative Example over the range of Δk×d of the light absorbing layer from 22 to 215 nm, and that the transmittance in the black state was minimized when the light absorbing layer has Δk×d at around 65 nm.

Example 3

Preparation and Evaluation of IPS-Mode Liquid Crystal Display Device

<Preparation of IPS-Mode Liquid Crystal Display Device>

A liquid crystal layer was formed by injecting a liquid crystal between two glass substrates, to thereby manufacture an IPS-mode liquid crystal cell having an inter-substrate distance (gap; d) of 3.4 μm. The liquid crystal layer was adjusted to have a Δn of 0.08765, and consequently to have a d·Δn of 298 nm. Two glass substrates were set so as to align the direction of rubbing in parallel with each other. Another IPS-mode liquid crystal display device was manufactured by bonding each of Wide-viewing-angle polarizing plates (a) to (g) of the present invention as the polarizing plate on the observer's side, and the comparative polarizing plate on the back light side. More specifically, the absorption axis of the polarizing plate on the back light side and the in-plane slow axis in the black state of the liquid crystal layer were parallel to each other, and the absorption axis of the polarizing plate on the observer's side and the in-plane slow axis in the black state of the liquid crystal layer were orthogonal to each other. In short, the individual IPS-mode liquid crystal display devices configured as illustrated in FIG. 4A were manufactured.

<Evaluation 1>

The viewing angle characteristics in the black state were evaluated by examining the state of transmission of light. The measuring instrument (EZ-Contrast 160D, from ELDIM) was used. Two sheets of the comparative polarizing plates prepared in the above were used for Comparative Example.

TABLE 5

| Polarizing plate No. | Light absorbing layer Δk × d [nm] | Transmittance in the black state in oblique direction*[1] [%] |
|---|---|---|
| (a) | 22 | 0.30% |
| (b) | 43 | 0.01% |
| (c) | 65 | 0.008% |
| (d) | 86 | 0.009% |

TABLE 5-continued

| Polarizing plate No. | Light absorbing layer Δk × d [nm] | Transmittance in the black state in oblique direction*[1] [%] |
|---|---|---|
| (e) | 129 | 0.02% |
| (f) | 172 | 0.04% |
| (g) | 215 | 0.06% |
| Comparative Example | — | 1% |

*[1]Transmittance in the black state measured in the direction at azimuth angle of 45° and at polar angle of 60°.

It can be understood from the results shown in the above that the IPS-mode liquid crystal display devices, using each of Wide-viewing-angle polarizing plates (a) to (g) of the present invention as a single polarizing plate, showed transmittance in the black state smaller than in Comparative Example over the range of Δk×d of the light absorbing layer from 22 to 215 nm, and that the transmittance in the black state was minimized when the light absorbing layer has Δk×d at around 65 nm.

<Evaluation 2>

Wide-viewing-angle polarizing plate (c), which was found in Evaluation 1 to be smallest in the transmittance in the black state in the oblique direction, was adopted to a commercially-available IPS liquid crystal panel, and evaluated. More specifically, polarizing plates provided to a commercially-available liquid crystal display device (from Toshiba Corporation, 26C1000, 26 inch size) having an IPS-mode liquid crystal cell were peeled off so as to separate the liquid crystal cell, and the liquid crystal cell was bonded with the wide-viewing-angle polarizing plate (c) on the observer's side (upper side), and with a conventional polarizing plate (the comparative polarizing plate) on the backlight side (lower side), using an acryl-base, pressure-sensitive adhesive. The absorbing axis of the polarizing plate on the backlight side and the in-plane slow axis in the black state of the liquid crystal layer were parallel to each other, and the absorbing axis of the polarizing plate on the observer's side and the in-plane slow axis in the black state of the liquid crystal layer were orthogonal to each other.

For Comparative Example, the conventional polarizing plates (comparative polarizing plates) were bonded to both surfaces on the observer's side (upper side) and on the back light'side (lower side) of the liquid crystal cell, to thereby prepare a liquid crystal panel.

Each of thus-prepared liquid crystal panels was assembled back into the liquid crystal display device, and observed. The IPS-mode liquid crystal display device, using a pair of the conventional polarizing plates, was found to cause leakage of light when viewed at an azimuth of 45° under increasing polar angle, meanwhile the IPS-mode liquid crystal display device, using the wide-viewing-angle polarizing plate (c) of the present invention combined with the conventional polarizing plate, was found to cause only a very slight leakage of light, proving the effect of the present invention.

Example 4

<Preparation of Cellulose Acylate Film, Retardation Film (h)>

A polymer solution, containing High-molecular weight plasticizer AA-1 (condensed compound of ethane diol and adipic acid, having mole ratio of 1/1; number-averaged molecular weight 1000), was heated at 30° C., and was cast on the mirror-surface of stainless support, having a diameter of 3 m, via a cast die unit. The surface temperature of the support was adjusted to −5° C., and the casting width was adjusted to 200 cm. The temperature of the atmosphere in the casting step was adjusted to 15° C.

| Formulation of Cellulose acylate solution A | |
|---|---|
| cellulose acetate having a mean degree of substitution of 2.94 | 100.0 parts by mass |
| methylene chloride (First solvent) | 475.9 parts by mass |
| methanol (Second solvent) | 113.0 parts by mass |
| butanol (Third solvent) | 5.9 parts by mass |
| silica particles having a mean particle size of 16 nm (AEROSIL R972 produced by JAPAN AEROSIL) | 0.13 parts by mass |
| high-molecular weight plasticizer (AA-1) | 15.0 parts by mass |
| agent for controlling wavelength dispersion (BB-1 shown below) | 6.0 parts by mass |
| citric acid ester | 0.01 parts by mass |

After that, the cellulose acylate film (web), having a residual solvent content of 270%, was peeled off from the support at the point of 50 cm in front of the end of casting area, conveyed by a pin tenter and then stretched with a 50% ratio (First stretching step).

The stretching ration in the first stretching step was obtained as a ratio of drum speed and tenter-speed. The stretching temperature, that is, the film-surface temperature of the web, was adjusted to −5° C. by controlling the drum using cooling medium.

After that, as a continuously-drying step (crystallization treatment), the film was dried in the drying zone so that the film-surface temperature was adjusted to 80° C. Then the film was dried at 140° C. for 20 minutes.

In this way, a cellulose acylate film having a width of 1400 nm and a thickness of 120 μm, was obtained and was winded up by a winder.

Re and Nz of the obtained cellulose acylate film were 270 nm and 1 respectively. The film showed regular wavelength dispersion of Re and the values of Re(450)/Re(550) and Re(630)/Re(550) were 1.2 and 0.95 respectively. This cellulose acylate film was used as Retardation film (h).

<Preparation of Cellulose Acylate Films, Retardation Films (i)-(s)>

A cellulose acylate film was prepared in the same manner as Retardation film (h), except that Compound BB-1, an agent for controlling wavelength dispersion, in the amount of 5.5% by mass was further added to Cellulose acylate solution A and the stretching ration and the film thickness were changed as shown in the following table. The film thickness was adjusted by controlling the slit-clearance of the stretching die unit. Nz values of Re values of the obtained cellulose acylate films were show in the following table.

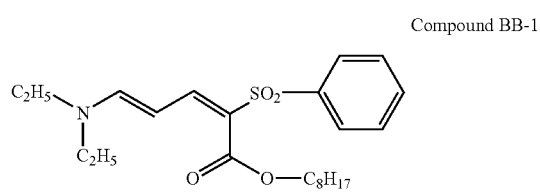

Compound BB-1

TABLE 6

| Retardation film No. | Stretching ratio (%) | Thickness (μm) | Nz | Re(nm) |
|---|---|---|---|---|
| (i) | 100 | 118 | 1 | 270 |
| (j) | 167 | 71 | 0.8 | 270 |
| (k) | 71 | 165 | 1.2 | 270 |
| (l) | 33 | 353 | 2 | 270 |
| (m) | 29 | 401 | 2.2 | 270 |
| (n) | 100 | 79 | 1 | 180 |
| (o) | 100 | 90 | 1 | 206 |
| (p) | 100 | 105 | 1 | 240 |
| (q) | 100 | 135 | 1 | 309 |
| (r) | 100 | 150 | 1 | 344 |
| (s) | 100 | 157 | 1 | 360 |

It is to be noted that all of the films shown in the table showed reversed wavelength dispersion of Re, and that the values of Re(450)/Re(550) and Re(630)/Re(550) were 0.9 and 1.03 respectively.

<Preparation of Cellulose Acylate Film, Retardation Film (t)>

A cellulose acylate film was prepared in the same manner as Retardation film (h), except that the amount of Compound AA-1, as an agent for controlling wavelength dispersion, was changed to 40% by mass, the stretching ration was changed to 200% and the film thickness was changed to 60 μm.

Re and Nz of the obtained cellulose acylate film were 270 nm and 0.5 respectively. The film showed reversed wavelength dispersion of Re and the values of Re(450)/Re(550) and Re(630)/Re(550) were 0.9 and 1.03 respectively. This cellulose acylate film was used as Retardation film (t).

<Preparation of Optical Compensation Film (h)-(t)>

The light absorbing layer mentioned above, Light absorbing layer (c), was transferred on to each of Films (h)-(t) using an adhesive layer to form each of Optical compensation films (h)-(t). It is to be noted that each of the light absorbing layer was bonded to each of the films so that the absorbing axis of the light absorbing layer was orthogonal to the stretching axis of the film.

The in-plane absorption anisotropy of the light absorbing layer in each of Optical compensation films (h)-(t) was measured using AxoScan, a polarimeter from Axometrics, Inc. All of thus-obtained optical compensation films have Δk×d of 65 nm and the degree of polarization of 0.628.

<Preparation of Polarizing Plate (h)-(t)>

Each of Optical compensation films (h) to (t) was respectively bonded to one surface of the polarizer (polyvinyl alcohol film) prepared in the above, using a polyvinyl alcohol-base adhesive. More specifically, the back surface (the surface on the side having no light absorbing layer) of the retardation film was bonded to the surface of the polarizer using an adhesive so that the absorption axis of the polarizer and the in-plane absorption axis of the light absorbing layer are parallel to each other.

Next, a commercially-available cellulose triacetate film (Fujitac TD80UF, from FUJIFILM Corporation) was saponified, and was then bonded, as a protective film, to the other surface of the polarizer using a polyvinyl alcohol-base adhesive.

Wide-viewing-angle polarizing plates (h) to (t), respectively having Optical compensation films (h) to (t), were prepared in this way.

For Comparative Example, a comparative polarizing plate was prepared by bonding a commercially-available cellulose triacetate film (Z-tac, from FUJIFILM Corporation), in place of the optical compensation film, to the polarizer. The commercially-available cellulose triacetate film herein was bonded so that the in-plane slow axis thereof was parallel to the absorption axis of the polarizer.

<Evaluation 1>

Regarding the obtained polarizing plates, evaluations were carried out in the same manner as Evaluation 1 in Example 3. Results were shown in the following table.

TABLE 7

| Polarizing plate No. | Nz | Transmittance in the black state in oblique direction [%] |
|---|---|---|
| (t) | 0.5 | 0.8% |
| (j) | 0.8 | 0.06% |
| (i) | 1 | 0.008% |
| (k) | 1.2 | 0.05% |
| (l) | 2 | 0.9% |
| (m) | 2.2 | 1.2% |
| Comparative Example | — | 1% |

It can be understood from the results shown in the above that the IPS-mode liquid crystal display devices, using each of Wide-viewing-angle polarizing plates (t), (j), (i), (k), (l) and (m) of the present invention as a single polarizing plate, showed transmittance in the black state smaller than in Comparative Example over the range of Nz of the retardation layer from 0.5 to 2, and that the transmittance in the black state was minimized when the retardation layer has Nz at around 1.

<Evaluation 2>

Regarding the obtained polarizing plates, evaluations were carried out in the same manner as Evaluation 2 in Example 3. Results were shown in the following table.

TABLE 8

| Polarizing Plate No. | Re (nm) | Transmittance in the black state in oblique direction [%] |
|---|---|---|
| (n) | 180 | 1.4% |
| (o) | 206 | 0.9% |
| (p) | 240 | 0.08% |
| (i) | 270 | 0.008% |
| (q) | 309 | 0.07% |
| (r) | 344 | 0.8% |
| (s) | 360 | 1.9% |
| Comparative Example | — | 1% |

It can be understood from the results shown in the above that the IPS-mode liquid crystal display devices, using each of Wide-viewing-angle polarizing plates (t) (n), (o), (p), (i), (q), (r) and (s) of the present invention as a single polarizing plate, showed transmittance in the black state smaller than in Comparative Example over the range of Re of the retardation layer from 206 to 344 nm, and that the transmittance in the black state was minimized when the retardation layer has Re at around 270 nm.

<Evaluation 3>

Regarding the IPS-mode liquid crystal displays employing Polarizing plate (c), (i) and (h) respectively, the values of Re(450), Re(550) and Re(630) of the retardation layer in each of Optical compensation film (c), (i) and (h) were shown in the following table along with the value of transmittance in the black state in oblique direction.

TABLE 9

| Polarizing plate No. | Re(450) (nm) | Re(550) (nm) | Re(630) (nm) | Transmittance in the black state in oblique direction [%] | Note |
|---|---|---|---|---|---|
| (c) | 221 | 270 | 284 | 0.008% | Re(450) < Re(550) < Re(630) (Reversed wavelength dependency) |
| (i) | 243 | 270 | 278 | 0.008% | Re(450) < Re(550) < Re(630) (Reversed wavelength dependency) |
| (h) | 324 | 270 | 257 | 0.010% | Re(450) > Re(550) > Re(630) (Regular wavelength dependency) |
| Comparative Example | — | — | — | 1% | |

It can be understood from the results shown in the above that the IPS-mode liquid crystal display devices, using each of Wide-viewing-angle polarizing plates (c) (i) and (h) of the present invention as a single polarizing plate, showed transmittance in the black state smaller than in Comparative Example, and that the transmittances in the black state of the IPS-mode liquid crystal display devices employing Wide-viewing-angle polarizing plates (c) and (i), showing reversed wavelength dependency, were smaller than that employing Wide-viewing-angle polarizing plates (h) minimized showing regular wavelength dependency.

What is claimed is:

1. An optical compensation film comprising a light absorbing layer and a retardation layer, wherein
   the light absorbing layer shows absorption anisotropy in the plane (x-y plane) thereof with respect to light of wavelength λ nm in the visible light region and a degree of polarization P of 0.986 or smaller, and
   the in-plane absorption axis of the light absorbing layer and the in-plane slow axis of the retardation layer are orthogonal to each other.

2. The optical compensation film of claim 1, wherein in-plane absorption coefficients kx(λ) and y(λ) (where, ky(λ)<kx(λ)) of the light absorbing layer and the thickness d (nm) of the light absorbing layer satisfy the following relation:

$$22 \text{ nm} \leq (kx(\lambda) - ky(\lambda)) \times d \leq 215 \text{ nm}.$$

3. The optical compensation film of claim 1, wherein in-plane absorption coefficients kx(λ) and y(λ) (where, ky(λ)<kx(λ)) of the light absorbing layer and the thickness d (nm) of the light absorbing layer satisfy the following relation $$65 \text{ nm} \leq (kx(\lambda) - ky(\lambda)) \times d \leq 215 \text{ nm}.$$

4. The optical compensation film of claim 1, wherein Nz of the retardation layer satisfies 0.5<Nz<2:
   where Nz is defined as Nz=Rth(550)/Re(550)+0.5; Re(550) is retardation in plane of the retardation layer measured at 550 nm; and Rth(550) is retardation along the thickness direction of the retardation layer measured at 550 nm; and
   Re(550) of the retardation layer is 206 to 344 nm.

5. The optical compensation film of claim 1, wherein retardation in plane the retardation layer measured at wavelength λ nm in the visible light region, Re(λ), satisfies the following relation:

$$Re(450) < Re(550) < Re(630).$$

6. The optical compensation film of claim 1, wherein the light absorbing layer is a layer formed of a composition comprising, at least, a rod-like liquid crystal and a dichroic dye.

7. A polarizing plate comprising at least a polarizer and an optical compensation film of claim 1, wherein the absorption axis of the polarizer and the in-plane absorption axis of the light absorbing layer are parallel to each other.

8. A liquid crystal display device comprising at least one polarizing plate of claim 7.

9. A liquid crystal display device of claim 8, employing an IPS-mode.

* * * * *